United States Patent [19]

Lucovsky et al.

[11] Patent Number: 5,758,184

[45] Date of Patent: May 26, 1998

[54] SYSTEM FOR PERFORMING ASYNCHRONOUS FILE OPERATIONS REQUESTED BY RUNNABLE THREADS BY PROCESSING COMPLETION MESSAGES WITH DIFFERENT QUEUE THREAD AND CHECKING FOR COMPLETION BY RUNNABLE THREADS

[75] Inventors: Mark H. Lucovsky, Issaquah; John D. Vert, Seattle; David N. Cutler, Bellevue; Darryl E. Havens, Bothell; Steven R. Wood, Woodinville, all of Wash.

[73] Assignee: Microsoft Corporation, Redmond, Wash.

[21] Appl. No.: 428,314

[22] Filed: Apr. 24, 1995

[51] Int. Cl.$^6$ ................................................ G06F 9/30
[52] U.S. Cl. .................................... 395/826; 395/677
[58] Field of Search ........................ 395/200, 250, 395/700, 155, 427, 200.08, 674, 650, 826, 677

[56] References Cited

U.S. PATENT DOCUMENTS

| | | | |
|---|---|---|---|
| 5,434,975 | 7/1995 | Allen | 395/200 |
| 5,493,728 | 2/1996 | Solton et al. | 395/250 |
| 5,504,898 | 4/1996 | Klein | 395/650 |
| 5,519,867 | 5/1996 | Moeller et al. | 395/700 |
| 5,555,368 | 9/1996 | Orton et al. | 395/155 |
| 5,555,388 | 9/1996 | Shaughnessy | 395/427 |
| 5,574,862 | 11/1996 | Marianetti, II | 395/200.08 |
| 5,598,562 | 1/1997 | Cutler et al. | 395/674 |
| 5,603,063 | 2/1997 | Au | 395/650 |

OTHER PUBLICATIONS

King, A., "Inside Windows™ 95," Microsoft Press, pp. 296–303 (1994).
Black, D.L., "Scheduling Support for Concurrency and Parallelism in the Mach Operating System," *Computer*, pp. 35–43 (May 1990).

*Primary Examiner*—Thomas C. Lee
*Assistant Examiner*—David Ton
*Attorney, Agent, or Firm*—Klarquist Sparkman Campbell Leigh & Whinston

[57] ABSTRACT

A technique for performing multiple simultaneous asynchronous input/output operations in a computer operating system. An input/output completion port object is created and associated with a file descriptor. When I/O services are requested on the file descriptor, completion is indicated by a message queued to the I/O completion port. A process requesting I/O services is not notified of completion of the I/O services, but instead checks the I/O completion port's queue to determine the status of its I/O requests. The I/O completion port manages multiple threads and their concurrency.

23 Claims, 4 Drawing Sheets

KERNEL QUEUE OBJECT

KERNEL QUEUE OBJECT

FIG. 4

I/O COMPLETION PORT OBJECT

I/O COMPLETION PORT
COMPLETION PACKET

SYSTEM FOR PERFORMING ASYNCHRONOUS FILE OPERATIONS REQUESTED BY RUNNABLE THREADS BY PROCESSING COMPLETION MESSAGES WITH DIFFERENT QUEUE THREAD AND CHECKING FOR COMPLETION BY RUNNABLE THREADS

RELATED APPLICATION DATA

This application is related to an application Ser. No. 08/427,007 by Cutler et al entitled Queue Object for Controlling Concurrency in a Computer System, filed concurrently herewith, now pending.

FIELD OF THE INVENTION

The present invention relates generally to computer operating systems, and more particularly relates to techniques for handling multiple asynchronous service requests, such as input/output operations, in computer operating systems.

BACKGROUND AND SUMMARY OF THE INVENTION

The present invention is described with reference to an illustrative application thereof, namely asynchronous input/output (I/O) operations. However, as will later be apparent, the invention is not so limited.

I/O is an essential element of every computer system and, accordingly is a well-developed, mature field. I/O includes not just inputting data from a keyboard and outputting data to a printer, but extends to myriad different devices and applications, from communicating with internal computer resources (e.g. disks and memory), to communicating with other computers across the country (e.g. network interfaces).

The most familiar model of I/O, popularized by the UNIX operating system (OS), is to view each I/O operation as a simple exchange of a stream of bytes with a virtual file. The virtual file can represent any source or destination for data.

In the UNIX environment, the virtual file is represented by file descriptors. In newer operating systems, such as the Windows NT operating system from Microsoft Corporation, virtual files (i.e. all potential sources or destinations for I/O) are represented by file objects, which are accessed by file handles. A file handle is an index into a process-specific table used to refer to an object, and incorporates a set of access rights granted to the process that owns the handle.

Returning to I/O operations generally, there are two basic types of I/O: synchronous and asynchronous.

Synchronous I/O is characterized by suspension of the calling process (e.g. an application program) until the requested I/O completes. (For example, when a word processing document is printed, operation of the word processor stalls until the printing is finished.) Completion of the I/O is signalled by an "interrupt" transmitted by the operating system to the program that requested the I/O. The program responds to the interrupt by resuming the suspended process.

Synchronous I/O is adequate in many circumstances. However modern computer processors are very fast—much faster than most I/O devices. In the time it takes an I/O device to service a single I/O request, the stalled processor might have been able to execute thousands or millions of lines of computer instructions. To rectify this inefficiency, operating systems from Microsoft (e.g. Windows NT), Digital Equipment Corp (e.g. VMS), AT&T (e.g. UNIX), and others have made widespread use of asynchronous I/O.

Asynchronous I/O is characterized by the continuation of computer processing while a requested I/O operation completes. After an I/O operation completes, the operating system notifies the calling application program, again usually via an interrupt. Once so notified, the calling application knows it can make use of any data obtained during the I/O operation. During the pendency of the I/O request, the application is free to attend to other tasks.

One powerful capability enabled by asynchronous I/O is the overlapping of several I/O operations by an application. For example, an application program may want to read data from the keyboard and send it to a file, while also reading data from a disk drive and writing it to the screen.

In response to each of these four file operations, the operating system will typically issue an interrupt to signal completion to the calling application. Associated with each interrupt is a fairly substantial processing overhead. Collectively, this overhead can consume an undue percentage of the computer's processing power, preventing its efficient execution of the intended task.

One aspect of the overhead associated with interrupts is the rote task of distinguishing the interrupts from one another. To make these distinctions, interrupts are routed to a vector table, which is consulted by the operating system to determine which interrupts correspond to which I/O requests. Once this correlation is made, a corresponding notification is issued to the application, usually by a jump to an address of an interrupt service routine as specified in the interrupt table.

When an interrupt occurs, the application must respond to it quickly. Constraints associated with most operating systems limit the number of interrupts that can be "nested," i.e. await service by an application, at any one time. The limit is relatively small—typically less than ten. If interrupts are nested to a level greater than this, the excess interrupts are lost, usually with grave results.

The requirement of immediate application program response to interrupts incurs additional overhead. For example, whatever application program processing that was taking place at the moment the interrupt is received must be suspended so the processor can execute the corresponding interrupt service routine. Suspension of the processing requires that various intermediate results resident in processor registers, etc., be swapped out to other memory locations to free these processor resources for the interrupt service. Conversely, when the interrupt servicing is completed, these intermediate results must be restored to their original locations so the interrupted application program processing can be resumed.

Another problem is that some I/O operations, such as large disk reads, are often implemented as several smaller operations. While there are certain advantages to this procedure, it results in a commensurate increase in overhead associated with interrupt servicing, and an attendant reduction in processing efficiency.

The foregoing problems are exacerbated in multiprocessing operating systems, in which several different applications are alternately executing and "sleeping" to effect apparent simultaneous execution. In this environment there is the further difficulty of correlating hardware interrupts to the applications to which they correspond—applications which may be "asleep" when the I/O completion interrupt corresponding thereto is returned.

The Berkeley Software Distribution version of the UNIX operating system (i.e. BSD UNIX 4.x) has a system call named select) that helps ameliorate some of these failings of interrupt-based asynchronous I/O. In UNIX systems using select, when an I/O operation completes, the resulting interrupt is handled by select, which sets a bit in a 32-bit mask corresponding to the completed I/O. This dedicated handling of I/O interrupts by select frees the application program to run without substantial I/O interruption.

To determine if a requested I/O is completed, the application program calls selects () and is provided in return with several bit masks which convey data about (a) which I/O devices are available to serve requests, (b) which I/O devices have completed requested operations, and (c) any I/O device exceptions. The application program then decodes this information to determine whether the I/O it requested is completed, and then proceeds accordingly.

While an improvement over earlier approaches, select has numerous problems of its own. One is that the temporal information provided to select by the order in which it receives the interrupts is lost; there is no way for the application programs to learn which I/O operations have been completed the longest. This is of particular concern in multi-tasking systems, in which ensuring "fairness" between concurrent processes requires knowledge of which I/O results have been waiting the longest for further processing.

Select also suffers from "collisions." Collisions arise when multiple processes attempt to select on the same I/O devices (i.e. file descriptors) at the same time. When collisions arise, each process making the select ( ) call receives a "failure" notification and must call select ( ) again, thereby generating more system overhead and interrupts.

A still further drawback of select( ) is its inability to deal with multi-threaded processes. Such processes are widely used in many newer operating systems, such as Microsoft Windows NT.

A multi-threaded process has two or more threads for process execution within a single process. Each thread shares the same address space, descriptors and other resources within the process, but has its own program counter for execution. To achieve concurrency using threads, an application program creates two or more threads within a process to execute different parts of the program within the same process. A multi-threaded process may be used for I/O operations on several descriptors, and can be used for I/O operations that happen on the same descriptor. A similar approach in the prior art splits a single-threaded process into multiple processes for execution. However, since processes require significantly more operating system overhead than threads, the multi-threaded process approach is preferred.

Select( ) cannot handle multiple threads or the concurrency that is required by simultaneous asynchronous I/O operations on the same descriptor, or different descriptors.

Another method used in the prior art to provide information about the occurrence of an I/O event is to send a messages to the corresponding file handle. Message queues are used to collect and pass message information in both threaded process environments, and non-threaded process environments. For example Windows 3.x uses message queues to route messages to windows applications. Windows 3.x maintains a single system message queue and any number of thread message queues, one for each thread. Whenever a user moves the mouse, clicks mouse buttons, or types at the keyboard (I/O events), the device driver for the mouse or keyboard converts the input into messages and places them in the system wide message queue. A Windows message handler removes the messages, one at a time, from the system message queue, examines them to determine the destination thread, and then posts them to message queue of the thread. A thread's message queue receives all mouse and keyboard messages from the system wide queue and directs the Windows kernel to send them to the appropriate Window's application associated with the thread for processing.

One disadvantage to sending all messages (including I/O messages) to a single system wide queue is that Windows must sort through and process a large number of different types of messages. This is expensive in terms of processing time. A queue per thread also is expensive in terms of system resources and system overhead. If a large number of threads are used, then a large number of thread queues have to be created, managed, and then deleted. Windows must also maintain a table of addresses for all the thread queues. Another disadvantage to this approach is that every message is "handled" at least three times (e.g. once by Windows to take it out of the single system queue, once by the thread to remove it from the thread queue, and once by the Windows application that must process the message). Handling every message several times causes significant operating system overhead and delaying the processing of individual applications that may be waiting for messages.

In accordance with a preferred embodiment of the present invention, the foregoing and other disadvantages of the prior art are overcome with an I/O completion port object. The I/O completion port object is an I/O object with a queue that provides a single synchronization point and controllable concurrency for multiple simultaneous asynchronous I/O operations. These multiple simultaneous asynchronous I/O operations could be the result of I/O requests from a single computer system, or a network of computer systems. For example, an I/O completion port can be used to synchronize hundreds of network I/O operations.

An I/O completion port is created and associated with a file descriptor. Any number of file descriptors can then be associated with a single I/O completion port. If a process creates a number of threads to complete an operation on a single or on multiple descriptors, then all the threads are also associated with an I/O completion port. As a result, the I/O completion port provides concurrency control for these multiple threads.

Once a file descriptor is associated with an I/O completion port, the completion of any subsequent I/O request on that descriptor causes an I/O completion port packet to be queued to the I/O completion port. The I/O completion port completion packet contains information about the I/O request (e.g. success, failure, amount of information transferred, etc.). Instead of having the I/O system contact the application which made the I/O request, the application checks the I/O completion port's queue to determine if the I/O request has been completed. The I/O completion port completion packet is then used to determine the state of the completed I/O and initiate any subsequent action.

The I/O completion port allows tracking of I/O operations not only per descriptor, but also per I/O operation. If multiple threads are created to complete the per I/O operation, then the concurrency of the threads is handled by the I/O completion port. For example, if a large read operation is split into several smaller read operations (several threads) of a certain block size, the I/O completion port can track the completion of the reads. If read number two finishes before read number one, the I/O completion port can be used by the application to determine which read was which.

The foregoing and additional features and advantages of the preferred embodiment of the present invention will be more readily apparent from the following detailed description, which proceeds with reference to the accompanying drawings.

DETAILED DESCRIPTION OF A PREFERRED EMBODIMENT

Figure 1:
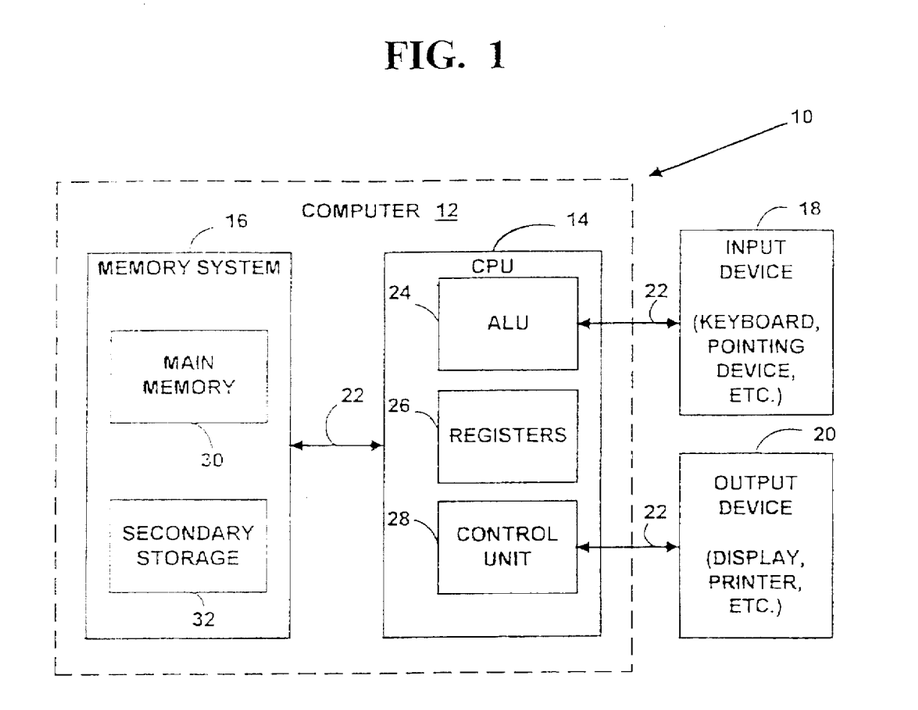
FIG. 1 is a block diagram of a computer system used for the preferred embodiment of this invention.

Referring to FIG. 1, an operating environment for the preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including at least those from Digital Equipment, Sun, MIPS, Motorola, NEC, Intel, Cyrix, AMD, and Nexgen, are equally preferred for CPU 14. (The preferred embodiment of the invention is in an operating system designed to be portable to any of these processing platforms.) A plurality of processors can also be used instead of a single CPU.

The memory system 16 includes main memory 30 and secondary storage 32. Illustrated main memory 30 takes the form of 16 megabytes of semiconductor RAM memory. Secondary storage 32 takes the form of long term storage, such as ROM, optical or magnetic disks, flash memory, or tape. Those skilled in the art will recognize that memory 16 can comprise a variety of alternative components.

The input and output devices 18, 20 are also familiar. The input device 18 can comprise a keyboard, a mouse, a physical transducer (e.g. a microphone), etc. The output device 20 can comprise a display, a printer, a transducer (e.g. a speaker), etc. Some devices, such as a network interface or a modem, can be used as input and/or output devices.

As is familiar to those skilled in the art, the computer system 10 further includes an operating system and at least one application program. The operating system is the set of software which controls the computer system's operation and the allocation of resources. The application program is the set of software that performs a task desired by the user, making use of computer resources made available through the operating system. Both are resident in the illustrated memory system 16.

In accordance with the practices of persons skilled in the art of computer programming, the present invention is described below with reference to symbolic representations of operations that are performed by computer system 10, unless indicated otherwise. Such operations are sometimes referred to as being computer-executed. It will be appreciated that the operations which are symbolically represented include the manipulation by CPU 14 of electrical signals representing data bits and the maintenance of data bits at memory locations in memory system 16, as well as other processing of signals. The memory locations where data bits are maintained are physical locations that have particular electrical, magnetic, or optical properties corresponding to the data bits.

The present invention is illustrated in the context of the Microsoft Windows NT operating system. For a complete discussion of the Windows NT OS see Inside Windows NT, by Helen Custer, Microsoft Press, 1993. A brief overview of part of the general operation of the Windows NT operating system and associated terminology is provided below before discussing the details of the preferred embodiment.

Figure 2:
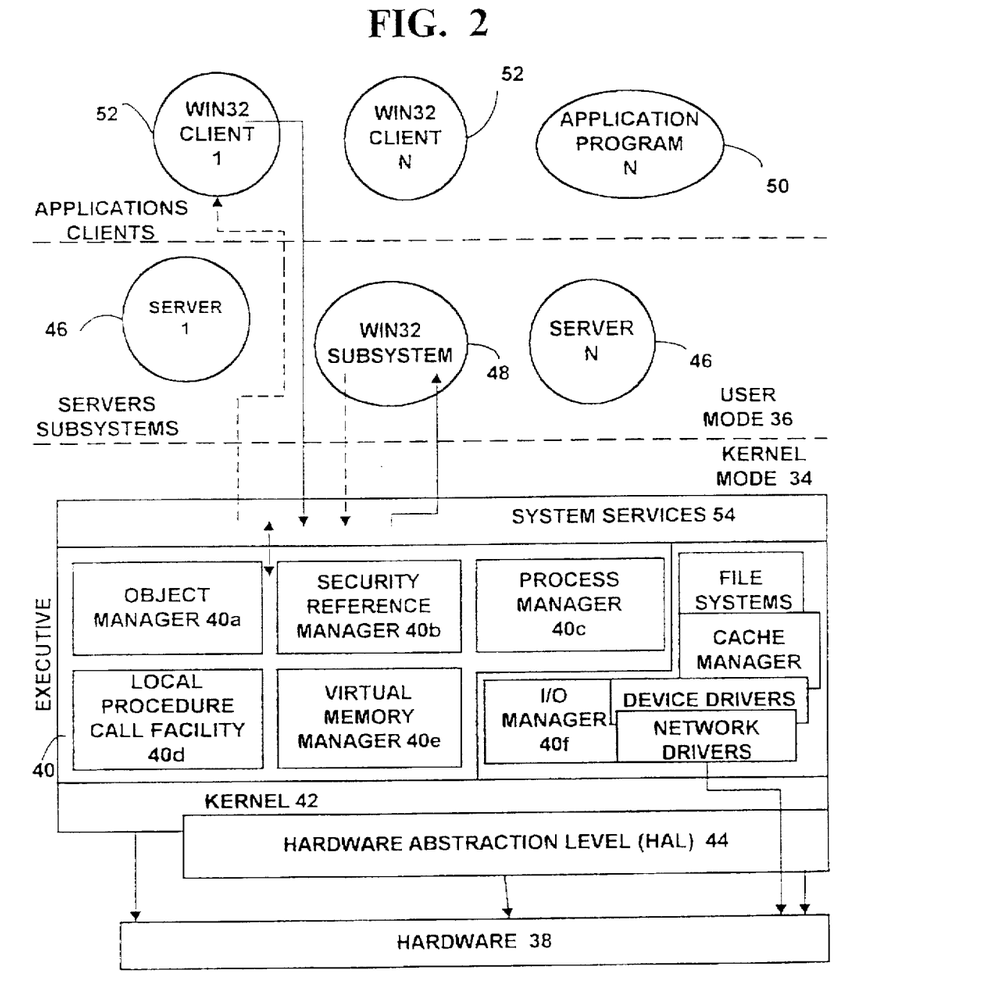
FIG. 2 is a block diagram of the components of the Windows NT operating system.

Referring to FIG. 2, the Windows NT operating system is divided into two parts: the "kernel mode" 34 and the "user mode" 36.

The kernel mode 34 is a privileged processor mode in which the operating system code runs with access to system data and to the hardware. Depicted as part of the kernel mode 34 is the physical computer hardware 38 itself (e.g. part or all of the computer system 10 of FIG. 1), since it is only through the kernel mode that these resources can be accessed.

The portion of the operating system depicted as part of the kernel mode 34 is called the "executive" 40. The executive comprises modules that implement object (resource) management 40a, portions of the security system 40b, process manager 40c, interprocess communication 40d, virtual memory management 40e, I/O manager 40f which includes file systems, device drivers, network drivers and the cache manager.

The bottommost portions of the executive are called the "kernel" 42 and the "hardware abstraction layer" ("HAL") 44. The kernel 42 performs low-level operating system functions, such as thread scheduling, interrupt and exception dispatching, and multiprocessor synchronization. The hardware abstraction layer (HAL) 44 is a layer of code that isolates the kernel and the rest of the executive from platform-specific hardware differences. The HAL thus hides hardware-dependent details such as I/O interfaces, interrupt controllers, and multiprocessor communication mechanisms. Rather than access hardware directly, the components of the executive maintain portability by calling the HAL routine when platform-specific information is needed.

The user mode 36 is a nonprivileged processor mode in which subsystems/servers (e.g. servers 46 and Win32 subsystem 48) and applications/clients (e.g. application programs 50 and Win32 clients 52) run, with a limited set of interfaces available and with limited access to system data.

Each subsystem 48 implements a single set of services, for example, memory services, process creation services, or processor scheduling services. The illustrated Win32 subsystem 48, for example, makes a 32-bit application programming interface (API) available to application programs. Each subsystem runs in user mode, executing a processing loop that checks whether a client 52 has requested one of its services. The client 52 may be another operating system component or an application program.

The executive 40 is a series of components, each of which implements two sets of functions: system services 54, which subsystems and other executive components can call, and a set of internal routines, which are available only to components within the executive. System services include (a) the object manager 40a, which is responsible for creating, managing and deleting objects (objects are abstract data structures used to represent operating system resources); (b) the process manager 40b, which is responsible for creating/terminating processes and threads, and for suspending/ resuming execution of threads; and (c) the I/O manager 40f, which is responsible for implementing device-independent input/output (I/O) facilities as well as device-dependent I/O facilities.

The client 52 requests a service by sending a message to a subsystem 48, as represented by the solid arrow between the depicted Win32 client 52 and the Win32 subsystem 48. The message passes through system services 54 and the executive 40, which delivers the message to the subsystem. After the subsystem 48 performs the operation, the results are passed to the client 52 in another message, as represented by the dotted arrow between the Win32 subsystem and the Win32 client.

In Windows NT, shareable resources, such as files, memory, processes and threads, are implemented as "objects" and are accessed by using "object services." As is well known in the art, an "object" is a data structure whose physical format is hidden behind a type definition. Data structures, also referred to as records or formats, are organization schemes applied to data so that it can be interpreted and so that specific operations can be performed on that data. Such data structures impose a physical organization on the collection of data stored within computer memory and represent specific electrical or magnetic elements.

An "object type," also called an "object class," comprises a data-type, services that operate on instances of the data type, and a set of object attributes. An "object attribute" is a field of data in an object that partially defines that object's state. An "object service" implements and manipulates objects, usually by reading or changing the object attributes. As noted, in the preferred embodiment, the object manager 40a is responsible for creating, deleting, protecting, and tracking user application visible objects.

The Windows NT operating system allows users to execute more than one program at a time by organizing the many tasks that it must perform into "processes" 46–52. The operating system allocates a portion of the computer's resources to each process and ensures that each process's program is dispatched for execution at the appropriate time and in the appropriate order. In the preferred embodiment, this function is implemented by the process manager 40c.

In the preferred embodiment, processes are implemented as objects. A process object comprises the following elements:

an executable program;
a private address space;
system resources (e.g., communication ports and files) that the operating system allocates to the process as the program executes; and
at least one "thread of execution."

A "thread" is the entity within a process that the kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Periodically, a thread may stop executing while, for example, a slow I/O device completes a data transfer or while another thread is using a resource it needs. Because it would be inefficient to have the processor remain idle while the thread is waiting, a multi-tasking operating system will switch the processor's execution from one thread to another in order to take advantage of processor cycles that otherwise would be wasted. This procedure is referred to as "context switching." When the I/O device completes its data transfer or when a resource needed by the thread becomes available, the operating system will eventually perform another context switch back to the original thread. Because of the speed of the processor, both of the threads appear to the user to execute at the same time.

It will be appreciated that context switching, while generally a very useful and beneficial procedure, can also reduce the performance level of the computer system if it is performed at a high rate. Every context switch consumes valuable processing time and resources, thereby reducing the amount of other useful work that the processing unit can accomplish. In addition, many context switches are superfluous, meaning that the context switch is not actually necessary. Those skilled in the art will appreciate that superfluous context switches increase latency and reduce the capacity of the system.

The Windows NT kernel is responsible for allocating the available threads and completing context switches in an efficient manner. To do this, Windows NT used a priority-based round-robin algorithm. This algorithm ensures no process or thread will be "starved" out of execution time (i.e. every process or thread will get a chance to execute periodically for a certain amount of time).

The Windows NT kernel supports 31 different priorities. There is a queue for each of the 31 priorities that contains all the ready threads at that priority. When a CPU becomes available, the kernel finds the highest priority queue with ready threads on it, removes the thread at the head of the queue, and runs it. This is the "context switch."

The most common reason for a context switch is when a running thread needs to wait for an event to complete. For example, the ReadFile( ) function call blocks the running thread until the specified read event completes. When a running thread needs to wait, the kernel picks the highest-priority ready thread and switches it to the running state. This ensures that the highest priority runnable threads are always running. This also prevents CPU-bound threads from monopolizing the processor, since the kernel imposes a time limit on each thread called a thread quantum. When a thread has been running for one quantum, the kernel preempts it and puts it at the end of the ready queue for its priority. On a uni-processor computer system, only one thread can be in the running state. A multi-processor computer system allows one thread per processor to be in the running state.

When the event a blocked thread is waiting for completes, the blocked threat is put on the end of the ready queue for its priority by the kernel. At some point, the thread which was blocked will be picked and executed by the kernel, completing the required transaction.

Figure 3A:
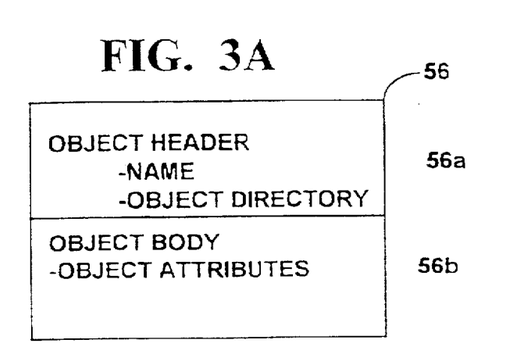
FIG. 3A is a depiction of a process object.

As was described above, processes (e.g. threaded processes) are implemented as objects. FIG. 3A is a depiction of a process object 56 including a header 56a and a body 56b. The header stores standard object attributes, such as the process's name and the object directory in which its name is stored. The process manager 40c defines the attributes stored in the body 56b of the process object. Included in the body 56b are the executable program, the private address space, and the other elements noted earlier.

The preferred embodiment of the present invention makes use of operating system data structures called "queue objects" which control the number of threads that are actively processing incoming requests to the operating system (otherwise known as the concurrency level). Queue objects keep track of how many threads are currently active, and ensure that the number of active threads is at or near a predetermined target level of concurrency. By ensuring that new threads are not added to the pool of active threads if the system is operating at or above the target level of concurrency, the preferred embodiment minimizes the number of superfluous context switches that the kernel must perform.

Queue objects, which are created by the operating system as needed and stored within the memory device 16, are "kernel objects," i.e., they are not visible to user-mode code. In other words, queue objects are used only within the OS kernel 34 (FIG. 2) and may therefore also be referred to as "kernel queue objects."

Figure 3B:
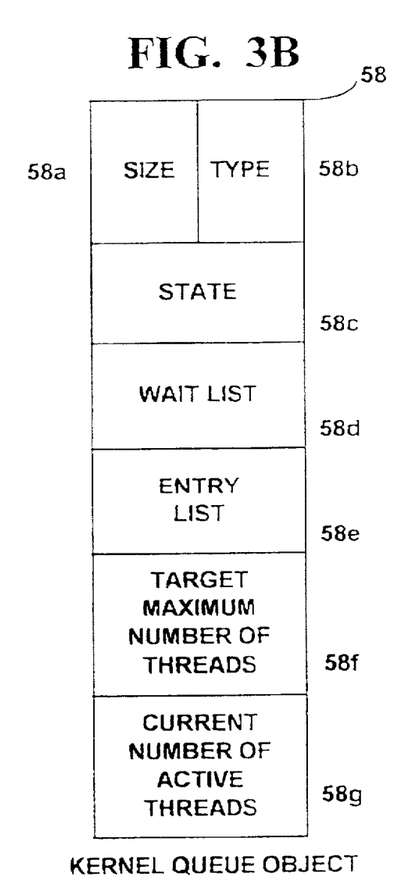
FIG. 3B is a depiction of a kernel queue object.

An exemplary kernel queue object 58 (sometimes referred to simply as a queue) is shown in FIG. 3B and is formatted as follows:

Size 58a: the size of the queue object. In the preferred embodiment, the size of the queue object is fixed at 32 bytes. However, other sizes can, of course, be used.

Type 58b: the name of the queue object of this type.

State 58c: the number of "work entries" in the entry list, as defined below. A "work entry" is any request that is placed in the queue object to be distributed to a thread for execution.

Wait List 58d: a list of threads that are waiting for a set of conditions to be satisfied so they can be removed from the wait list and placed in the ready queue. In the preferred embodiment, threads are waiting either for a work entry to be inserted into the entry list, as defined below, and/or for the "concurrency level" to drop below the target maximum number of threads. The "concurrency level" is defined as the current number of active threads.

Entry List 58e: a list of work entries to be distributed to the pool of threads for execution.

Target Maximum Number of Threads 58f: the target number of threads that should be active processing queue object entries concurrently. In general, this value is set to the desired level of concurrency with respect to the queue object and is therefore also referred to as the "target concurrency level." In the preferred embodiment, the target maximum number of threads has a default value set to the number of processing units in the system, but is not limited to this value.

Current Number of Active Threads 58g: the number of threads that are currently active, i.e., in the ready state, the standby state, the running state, or the transition state. This number is also referred to as the "current concurrency level" or simply the "concurrency level."

The preferred embodiment provides a kernel queue object called an "I/O completion port object" (FIG. 4) that reports I/O completion status of an open file or device. The I/O completion port object is created by a user mode 36 component (e.g. a subsystem or an application program) by calling the executive 40. In response to this call, the object manager 40a within the executive creates an I/O completion port object, an optional name for the object, and an optional access control list, and returns a handle that the user mode component can refer to when referencing the I/O completion port object.

Figure 4:
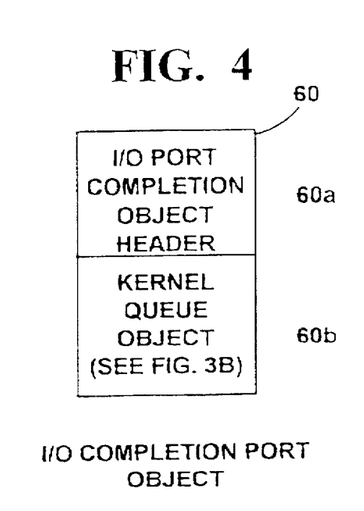
FIG. 4 is a depiction of the I/O completion port object.

In operation, when an I/O completion port object is referred an I/O request, the I/O completion information is placed in the I/O completion port object entry list. The user mode subsystem or application program then has threads that wait on the I/O completion port object.

Referring to FIG. 4, the I/O completion port object 60 includes an object header 62a with an embedded kernel queue object 62b. The object header and attributes of the I/O completion port object follow the standard conventions for kernel objects in the Windows NT operating system.

As noted in the background discussion, one of the problems with asynchronous I/O arises in the context of multi-threaded operating systems. Completion of an asynchronous I/O request must be reported to the thread that issued the I/O request.

Figure 5:
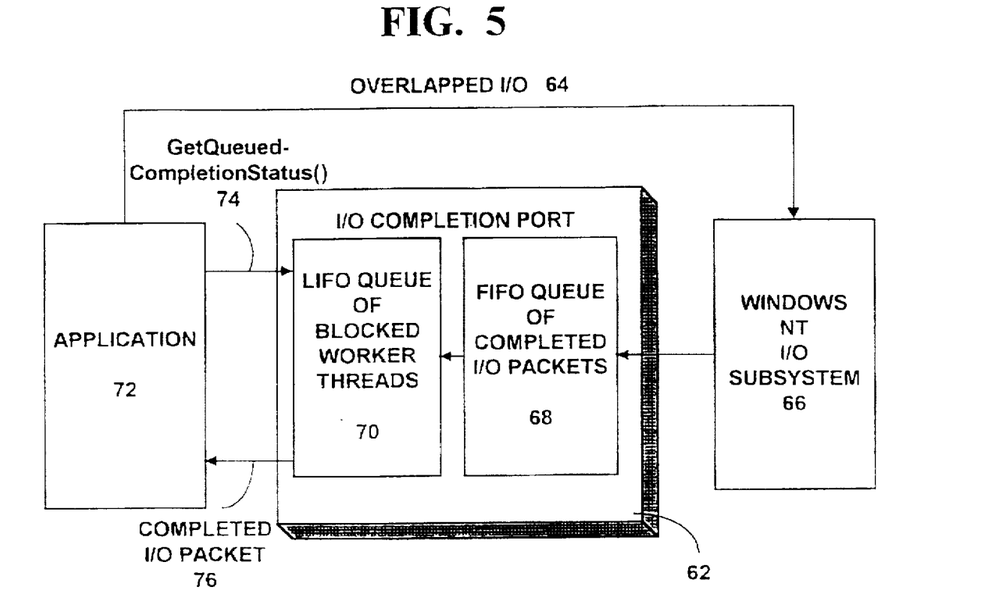
FIG. 5 is a depiction showing use of the I/O completion port object of FIG. 4.

The I/O completion port object provides a solution to this problem. Referring to FIG. 5, completion port object 62 and overlapped I/O 64 are used to support multiple clients on a single thread. When an I/O request is completed, the completion information is routed by the Windows NT I/O subsystem 66 to a completed I/O queue 68 within the I/O object completion port object 62, rather than directly to the thread that requested the I/O operation. A small set of threads 70 are provided that wait on the queue object to which all I/O completion information is sent. Thus, I/O completion is not tied to the thread that issued the I/O request. When a queue entry 68 (i.e., the I/O completion) appears in the queue object, and there is a thread 70 waiting to process that entry, and the maximum target level of concurrency is not exceeded, then the queue entry is given to the waiting thread. Thus, the I/O completion port object can service a large number of incoming requests with a much smaller pool of threads than in current synchronization methods.

Since the existing Windows NT service WaitForMultipleobjects can be used to support multiple clients on a single thread, the I/O completion port object was created to provide additional functionality. One important new feature provided by the I/O completion port is controllable concurrency. An I/O completion port's concurrency value is specified when it is created. This value limits the number of runnable threads associated with the port. When a thread waits on a completion port, the executive 40 associates the thread with the port it is waiting on. The executive is then responsible for trying to prevent the total number of runnable threads associated with an I/O completion on that port from exceeding the port's concurrency value (i.e. throttling). It does this by blocking threads 70 waiting on an I/O completion port until the total number of runnable threads associated with the port drops below its concurrency value.

As a result, when an application thread 72 calls the I/O completion port (via the GetQueuedCompletionStatus service request 74 explained below), the thread only returns when there is completed I/O available, and the number of runnable threads associated with the I/O completion port is less than the port's concurrency. The executive 40 dynamically tracks the completion port's runnable threads. When one of these threads blocks, the executive checks to see if it can awaken a blocked thread waiting on the I/O completion port to take its place. This throttling effectively prevents the system from becoming swamped with too many runnable threads. Since there is one central synchronization point for all the I/O, a small pool of worker threads can service many clients.

Unlike the rest of the Windows NT synchronization objects, threads that block on waits to an I/O completion port are unblocked in a last-in-first-out (LIFO) order 70. Since it does not matter which thread services an I/O completion, the most recently active thread is woken up. Threads at the bottom of the stack have been waiting for a long time and will usually continue to wait, allowing the system to swap most of their memory resources out to disk. Threads near the top of the stack are much more likely to have run recently, so their memory resources will not be swapped to disk or flushed from the processor's cache. The net result is that the number of threads waiting on the I/O completion port is not very important. If more threads than are needed block on the port, the unused threads simply remain blocked. The system will be able to reclaim most of their resources, but the threads will remain available if there are enough outstanding transactions to require their use. A dozen threads can easily service a large set of clients, although this will vary depending on how often each transaction needs to wait. Note that the LIFO policy only applies to threads that block on the I/O completion port. The I/O completion port delivers completed I/O in first-in-first-out (FIFO) order 68.

Tuning the I/O completion port's concurrency is a little more complicated. The best value to pick is usually one thread per CPU. This is the default if zero is specified at the creation of the I/O completion port. There are a few cases where a larger concurrency is desirable. For example, if the I/O transaction requires a lengthy computation that will rarely block, a larger concurrency value will allow more threads to run. The executive 40 will preemptively timeslice among the running threads, so each transaction will take longer to complete. However, more transactions will be processing at the same time, rather than sitting in the I/O completion port's queue, waiting for a running thread to complete. Depending on the application, this may provide quicker response to clients. Simultaneously processing more transactions allows applications to have more concurrent outstanding I/O, resulting in higher utilization of the available I/O throughput.

As discussed above, queue objects are "kernel objects," i.e., they are created and used only within the kernel, and only components that run in kernel mode 50 can access and use queue objects directly. Therefore, user mode subsystems and application programs cannot use queue objects like the I/O completion port object unless there is a "kernel object" that exports the capabilities of queue objects to user mode 36.

An I/O completion port object is exposed to the user application through three operating system services: CreateIoCompletionPort, GetQueuedCompletionStatus and PostQueuadCompletionStatus.

The CreateIoCompletionPort ( ) function call provides a way to create an I/O completion port handle, and attach application file handles to the created I/O completion port. CreateIoCompletionPort( ) takes 4 arguments: FileHandle, CompletionPort, CompletionKey, and NumberofConcurrentThreads. FileHandle is a file handle defining a client that will use the I/O completion port, CompletionPort is handle defining the I/O completion port, CompletionKey is a double word variable that contains an application defined per-file handle context. When an I/O operation completes, this value is returned as part of the return values from GetQueuedCompletionStatus( ). NumberofConcurrentThreads is a double word defining the number of threads to execute concurrently.

The GetQueuedCompletionStatus( ) function call provides a way for an application to get I/O completion packets from the I/O completion port. GetQueuedcompletionStatus( ) takes 5 arguments: CompletionPort, &nbytes, &WorkIndex, &lpo, WaitTime. CompletionPort is the handle identifying the I/O completion port returned from CreateIoCompletionPort( ). The argument &nbytes is the address of a variable which will be filled with the number of bytes read and/or written for the I/O request. The argument &WorkIndex is the address of a double word which will be filled with the file handle context that was established as the value CompletionKey in the CreateIoCompletionPort( ) call. The argument &lpo is the address of the Windows NT lpOverlapped structure which contains fields for determining the number of I/O errors that may have occurred with the I/O service request, and the context of the I/O. The argument WaitTime is a timeout value for how long the call to GetQueuedCompletionStatus( ) should wait before returning—if there are no I/O completion packets returned to the I/O completion port queue for the application. The I/O port completion packet (explained below) is obtained from a call to GetQueuedCompletionStatus( ).

The PostQueuedCompletionStatus( ) function call allows an application to queue I/O completion packets directly to the I/O completion port. The PostQueuedCompletion Status( ) takes four arguments: CompletionPort, NumberofBytesTransferred, CompletionKey, and lpOvelapped. CompletionPort supplies a handle to the completion port that the caller wants to post a completion packet to. NumberofBytesTransferred is a double word which supplies the value that is to be returned in the lpNumberofBytesTransfered parameter of the GetQueuedCompletionStatus( ) application program interface (API). CompletionKey is a double word that supplies the value that is to be returned through the lpCompletionKey parameter of the GetQueuedCompletionStatus ( ) API. The lpOverlapped argument is an LPOVERLAPPED structure that supplies the value that is to be returned through the lpOverlapped parameter of the GetQueuedCompletionStatus( ) API. The use of PostQueuedCompletionStatus( ) function call will be explained below.

The preferred way to use I/O completion ports in a server application is to create one handle for each client (using ConnectNamedPipe( ) or listen( ), depending on the IPC mechanism) and then call CreateIoCompletionPort( ) once for each handle. The first call to CreateIoCompletionPort( ) creates the I/O completion port and returns its handle. Subsequent calls associate additional handles with that I/O completion port. This combines the synchronization point for multiple file handles into a single object. For example, synchronizing hundreds of network I/O operations over multiple file handles to a single I/O completion port would be accomplished by calling CreateIoCompletionPort ( ) once for each network I/O file handle.

After a client establishes a connection, and the handles are associated with the I/O completion port, an asynchronous read is posted to the client's handle.

The following C/C++ language code fragment shows how a number of file handles may be associated with an I/O completion port.

```
for(i =1; i < NumberofClients; i++)
{
/* 1st call creates CompletionPort handle
*/
CompletionPort =
CreateIoCompletionPort(FileHandle[i],
CompletionPort, i, NumberofCurrentThreads);
if(!CompletionPort)
{
fprintf(stdout, "CompletionPort Create
Failed\n");
/* handle errors here */
}
/* Start off an asynchronous read on the
socket
*/
bytes_read = ReadFile(FileHandle[i]);
if(!bytes_read) /* check return status */
{
fprintf(stdout, "Readfile Failed\n");
/* handle error here */
}
}
```

Thereafter, when an asynchronous I/O request initiated on a file handle associated with the I/O completion port object completes, an I/O completion packet is queued to the I/O completion port 62. The contents of the I/O completion packet are explained below.

When an asynchronous I/O completion is received by the Windows NT subsystem 66 (FIG. 5), if the current number of runnable threads for the I/O completion port is less than the port's concurrency, the I/O completion port object will be signaled. If there are threads waiting on the port, the executive 40 will wake up the last thread 70 (waits on I/O completion ports are satisfied in LIFO order) and hand it the I/O completion packet. If there is no thread currently waiting on the port, the packet will be handed to the next thread that calls GetQueuedCompletionStatus.

The most efficient scenario occurs when there are I/O completion packets waiting in the queue 68, but no waits can be satisfied because the port has reached its concurrency limit. In this case, when a running thread completes a transaction, it calls GetQueuedCompletionStatus to pick up its next transaction and immediately picks up the queued I/O packet. The running thread never blocks, the blocked threads never run, and no context switches occur. This demonstrates one of the most interesting properties of I/O completion ports: the heavier the load on the system, the more efficient they are. In the ideal case, the worker threads never block, and I/O completes to the queue at the same rate that threads remove it. There is always work on the queue, but no context switches ever need occur. After a thread completes one transaction, it simply picks the next one off the completion port and keeps going.

The queuing of the I/O completion port packets is performed by the Windows NT I/O manager 40f and is completely transparent to the application that initiated the I/O operation. The kernel queue object is used by the I/O manager for the queuing of completed I/O packets. This allows an I/O completion port object to benefit from all the features of a kernel queue object, particularly the controllable concurrency level.

To receive notification of completed I/O, an application 72 tries to remove I/O completion packets from the I/O completion ports queue with the GetQueuedCompletionStatus( ) 74 service. The following C/C++ language code fragment shows how an application may obtain I/O completion messages from the I/O completion port.

```
return = GetQueuedCompletionStatus(
CompletionPort,&lpNumberofBytesTransferred,
&lpCompletionkey, &lpoverlapped, INFINITE);
if(!return)
{
fprintf(stdout, "GetQueued I/O
failed n");
/* handle error here */
}
/* process return values that form
* completion packet
*/
```

The order of removal is the order of completion of the I/O operations done on the set of file handles associated with the I/O completion port. The I/O completion port returns I/O completion notification in FIFO order 68. Under Windows NT, this method returns the information associated with the I/O in an I/O completion packet 76.

Figure 6:
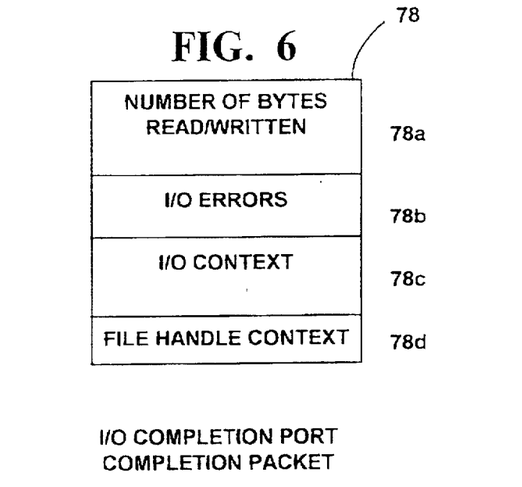
FIG. 6 is a diagram of I/O completion port, I/O completion packet.

An I/O completion packet 78 is shown in FIG. 6. The I/O completion packet 78 contains the number of bytes read/written 78a, error indications 78b, the context associated with the particular I/O operation 78c, and the context associated with the particular file handle 78d. Through the use of the contents of the I/O completion packet 78, an application 72 can easily determine the state of completed I/O and initiate any subsequent action.

An application may also queue I/O completion packets directly to the I/O completion port with the PostQueuedCompletionStatus( ) method. The application must specify the contents of the entire I/O completion packet, and the resulting packet is queued directly to the I/O completion port with no interaction with the I/O manager 40f. This approach may be used in special circumstances when an application wants to avoid using the normal I/O completion port method.

A method of selectively initiating I/O that will not cause an I/O completion packet to be queued on its completion is also provided. Under Windows NT, this is initiated through the same methods as other I/O. A bit in the Event field of the lpOverlapped structure is used to indicate to the I/O manager that the completed I/O resulting from this particular operation should not be queued to the I/O completion port, but should complete through the normal mechanism.

Having illustrated and described the principles of the present invention in a preferred embodiment, it should be apparent to those skilled in the art that the embodiment can be modified in arrangement and detail without departing from such principles. For example, while the invention has been described in the context of an object-oriented operating system, it will be recognized that the invention finds applicability in other types of operating systems as well. Similarly, while the invention has been illustrated with reference to a queue as the operative data structure, those skilled in the art will recognize that other data structures can be used to similar effect.

Likewise, it will be recognized that other embodiments of the present invention can incorporate the principles thereof in conjunction with interrupt notification techniques. For example, the assembly and transmission to a queue of an I/O notification packet can be accomplished by a process that responds to I/O interrupts.

Similarly, while the invention has been illustrated with reference to read and write file operations, it will be recognized that the same techniques are equally applicable to any file operations, including locking, querying information, and setting information.

More fundamentally, while the invention has been illustrated with reference to queuing completion messages from I/O operations, the invention is not so limited. Instead, it finds applicability in any context in which a service is asynchronously requested from the operating system by an application program.

In view of the wide range of embodiments to which the principles of our invention can be applied, it should be recognized that the illustrated embodiments are illustrative only and should not be taken as limiting the scope of our invention. Rather, we claim as our invention all such embodiments as come within the scope and spirit of the following claims and equivalents thereto.

We claim:

1. In a computer system that includes a processor, an operating system and one or more application programs running on said computer system, the operating system being a multi-tasking operating system that supports execution of a plurality of processes with a plurality of runnable threads, where one or more of the runnable threads is used to execute an individual application program, the system further including a memory device coupled to the processor and accessible by said operating system, a method for performing asynchronous file operations comprising:

requesting one or more file operations from one or more of the runnable threads;

on completion of the requested file operation, adding a completion message to a queue object stored in said memory without notifying the runnable thread that requested the file operation, the queue object implementing a multi-tasking concurrency control with a fixed number of queue threads;

processing completion messages in the queue object with a queue thread that is different from the runnable thread which requested the file operation; and from time to time checking the queue object from the runnable threads for information on completed file operations requested by the runnable threads.

2. The method of claim 1 in which retrieval of completion messages from the queue object is blocked while the number of queue threads used for said processing is at the fixed number of queue threads.

3. The method of claim 1 which includes responding from the queue object to said checking only if the multi-tasking concurrency control is met.

4. The method of claim 1 which includes formatting the completion messages to include data indicating a file handle to which the completed file operation relates, where the file handle is an index into a process-specific table and incorporates a set of access rights granted to a process that owns the handle.

5. The method of claim 1 which includes formatting the completion message to include data indicating the particular file operation that has been completed, the data including the number of bytes read or written, the number of file operation errors, and the file operation context which includes volatile data associated with the execution of the file operation.

6. The method of claim 1 which includes:

requesting a second file operation after requesting a first file operation;

completing the second requested file operation before completing the first requested file operation;

adding a completion message to the queue object relating to completion of the second file operation;

completing the first requested file operation after completion of the second requested file operation; and adding a completion message to the queue object relating to completion of the first file operation;

wherein an application program can respond to completed file operations in the order completed rather than the order requested by checking the queue object.

7. The method of claim 6 in which the ordering of completion messages in the queue object affects the order of runnable threads used for application program execution.

8. The method of claim 1 which includes:

checking the object queue from an application program; and responding to completed file operations in the order of their completion, as determined by the ordering of completion messages in the object queue, rather than the original order of the file operation requests.

9. The method of claim 1 in which the requested file operation is executed as part of an existing runnable thread, rather than as a new, independent runnable thread dedicated to the file operation thereby limiting the number of new independent runnable threads allocated by the operating system for completing the file operation requests.

10. The method of claim 1 which includes checking the queue from the application program, where the checking is completed without the application program immediately entering a blocking wait state, and wherein notification of completed file operations is provided to the application as a response to its own inquiry, rather than as an operating system interrupt to awaken the application program.

11. The method of claim 1 in which the requested file operations are any of: read, write, lock, query information or set information.

12. A computer readable medium having stored therein instructions for causing a computer to perform the method of claim 1.

13. The method of claim 1 wherein the queue object includes two queues: a first-in-first-out queue for storing the completion messages and a last-in-first-out queue for storing blocked runnable threads.

14. The method of claim 1 further comprising the application programs using the completion messages to determine the state of the file operation and initiate any subsequent actions based on the state of the file operation.

15. The method of claim 1 further comprising:

checking the queue object from an individual runnable thread for information on a requested file operation; and allowing the individual runnable thread to access information in the queue object for the requested file operation only when the number of queue threads is no more than the fixed number of queue threads used for the multi-tasking concurrency control, and there is a completion message for the requested file operation.

16. The method of claim 1 wherein the fixed threshold number of queue threads in the queue object for multi-tasking concurrency control is specified when the queue object is created, and cannot be altered until the queue object is deleted.

17. In a computer system that includes a processor, an operating system and a plurality of application programs, the operating system being a multi-tasking operating system that supports execution of a plurality of processes with runnable threads which are used to execute the plurality of application programs, a method of performing asynchronous file operations comprising:

creating an input/output completion queue;

creating a plurality of file handles for a plurality of runnable threads desiring to use the services of the input/output completion queue, where the file handle is an index into a process-specific table and incorporates a set of access rights granted to processes that own the handles created for selected ones of the runnable threads; and associating the plurality of file handles with the input/output completion queue, thereby providing access to input/output services for each of the plurality of runnable threads.

18. A computer readable medium having stored therein instructions for causing a computer to perform the method of claim 17.

19. In a computer system that includes a processor, an operating system and a plurality of application programs, the operating system being a multi-tasking operating system that supports execution of a plurality of processes with a plurality of runnable threads which are used to execute the plurality of application programs, a method of providing concurrency control in a queue object, comprising:

allocating a queue object having a blocked thread queue and a multi-tasking concurrency control, the multi-tasking concurrency control including a fixed number of queue threads;

requesting a service from the queue object from a runnable thread; and determining whether a first queue thread is available at a first time to process the service request by checking the multi-tasking concurrency control, and if so, providing the requested service with the first queue thread, and if not, blocking the runnable thread by placing the runnable thread in the blocked thread queue until a second queue thread is available at a second time, and then providing the requested service with the second queue thread, and removing the runnable thread from the blocked thread queue.

20. A computer readable medium having stored therein instructions for causing a computer to perform the method of claim 19.

21. The method of claim 19 wherein runnable threads placed in the blocked thread queue are unblocked in a last-in-first-out order.

22. The method of claim 19 further comprising:

providing an executive process in the operating system which dynamically tracks the number of available queue threads using the multi-tasking concurrency control;

determining from the executive process when a first runnable thread is blocked, whether a second runnable thread in the blocked thread queue can unblocked, and if so, unblocking the second runnable thread, thereby keeping the number of threads in the blocked thread queue at a constant number and preventing the operating system from completing an operating system context switch for the first blocked thread.

23. The method of claim 19 further comprising:

determining whether any blocked threads in the blocked thread queue have been blocked longer than a predetermined threshold time, and if so, allowing the operating system to swap the operating system resources occupied by the blocked threads which have been blocked longer than a predetermined threshold time secondary storage, thereby increasing the number of operating system resources available to other runnable threads.

* * * * *